United States Patent [19]

Lieu

[11] Patent Number: 5,109,186
[45] Date of Patent: Apr. 28, 1992

[54] PWM STEP-DOWN MOSFET REGULATOR

[75] Inventor: Fan-Yi Lieu, Taoyuan, Taiwan

[73] Assignee: Delta Electronic Industrial Co., Ltd., Taiwan

[21] Appl. No.: 554,765

[22] Filed: Jul. 20, 1990

[51] Int. Cl.⁵ .............................................. G05F 5/00
[52] U.S. Cl. .................... 323/299; 323/282; 323/351
[58] Field of Search ............... 323/282, 283, 284, 299, 323/351, 285

[56] References Cited

U.S. PATENT DOCUMENTS

| | | | |
|---|---|---|---|
| 4,061,461 | 4/1977 | Roland | 323/282 |
| 4,760,324 | 7/1988 | Underhill | 323/282 |
| 4,959,764 | 9/1990 | Bassett | 323/282 |

Primary Examiner—Steven L. Stephan
Assistant Examiner—Jeffrey Sterrett
Attorney, Agent, or Firm—Lowe, Price, Leblanc and Becker

[57] ABSTRACT

A regulated step-down switching circuit for a DC-to-DC converter of a power supply includes a pulse width modulation IC, a MOS-FET, a zener diode, a plurality of diodes, capacitors, resistors, and an inductor. The drain of the MOS-FET is connected to a power supply, with its source being connected to a power output lead. The gate of the MOS-FET is connected to one of the transistors of the pulse width modulation IC. A series combination of a diode and capacitor is connected between the source and the drain of the MOS-FET. A second diode and resistor series combination is connected to the junction of the diode and capacitor forming the first series combination and supplies a voltage to the transistor within the pulse width modulation IC as well as being connected to a parallel combination of a zener diode, a capacitor and a diode parallel branches. The other ends of the parallel branches are connected to the power input lead and the pulse width modulation IC. Through these arrangements, when the voltage rises, it will actuate the whole circuit to operate.

5 Claims, 2 Drawing Sheets

PWM STEP-DOWN MOSFET REGULATOR

The present invention relates to a regulated step-down switching circuit a DC-to-DC converter of a power supply, in particular, including a DC-to-DC converter pulse width modulation IC and a MOS-FET to regulate the step-down output supplied by a power supply.

BACKGROUND OF THE INVENTION

Power are indispensable major components provided in computers, electronic devices and communication equipments. The function is to provide one or more regulated voltage sources for the equipments.

The conventional regulated step-down switching circuit used for a power supply DC-to-DC converter is represented by the circuit shown within the solid line rectangular enclosure (A) in FIG. 1. Such a conventional switching circuit is available from the "Linear Technology Corporation". The circuit comprises two metal-oxide-semiconductor field effect transistors (MOS-FET11 and MOS-FET12), a transistor (Q11), a voltage regulator (IC1), two diodes (D12 and D14), two capacitors (C11 and C12) and resistors (R11, R12, R13, R14 and etc.). MOS-FET11 becomes conductive when the voltage applied at its gate is greater than the input voltage.

But this circuit possesses defects as follows: First, the circuit requires two MOSFET, a voltage regulator IC, a transistor, and a number of passive components such as capacitors, resistors, etc. because the circuitry of conventional converters is complex, more parts are required to construct such a circuit, and consequently, production costs are increased and reliability is reduced. Second, the voltage regulator IC of this circuit operated continuously so that it always consumes power.

SUMMARY OF THE INVENTION

In view of the problems of the conventional regulated step-down switching circuit for the a power supply DC-to-DC, the purpose of the present invention is to provide an innovational regulated step-down switching circuit, with a simple structure, precise in action, increased reliability and more efficient in performance as compared with conventional circuits used a power supply DC-to-DC for the converter.

Since the present invention has a simple circuit structure as compared with conventional circuits, productions costs are greatly reduced, which is one of the advantages of the present invention.

Because the present invention uses fewer active parts and passive parts as well being more efficient as compared with the conventional ones, better reliability can be expected.

Furthermore, as compared with the conventional circuits, which consumes power constantly, the present invention operates only when the voltage increases, resulting in an energy-saving. This is another advantage of the present invention.

The following detailed description of the embodiments as illustrated in the attached drawings can offer a better understanding of the above statements.

DETAILED DESCRIPTION OF THE PREFERRED EMBODIMENTS

Figure 1:
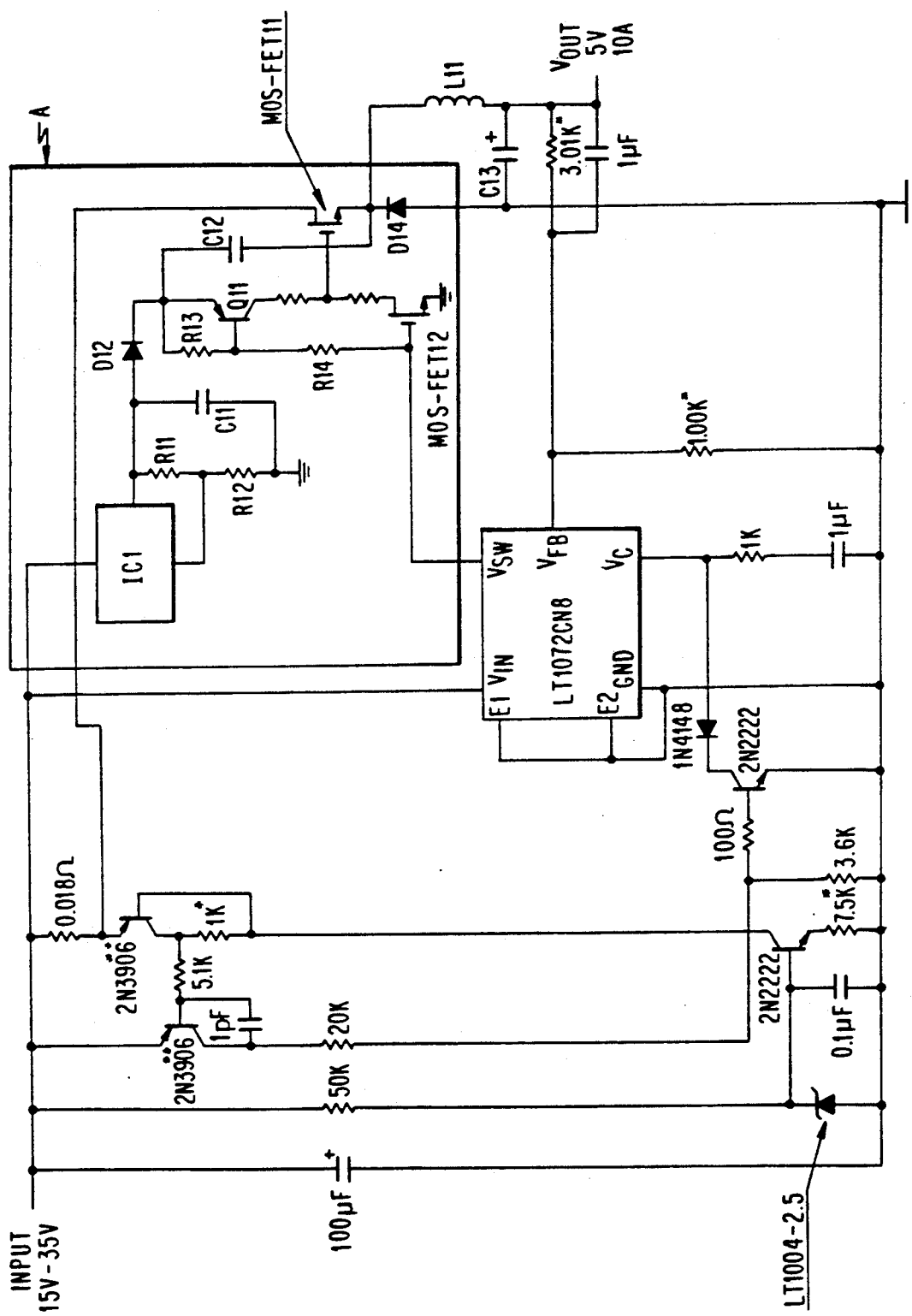
FIG. 1 shows a schematic diagram of a conventional regulated step-down switching circuit (enclosed by a solid line rectangle A) for the DC converter of a power supply.
Figure 2:
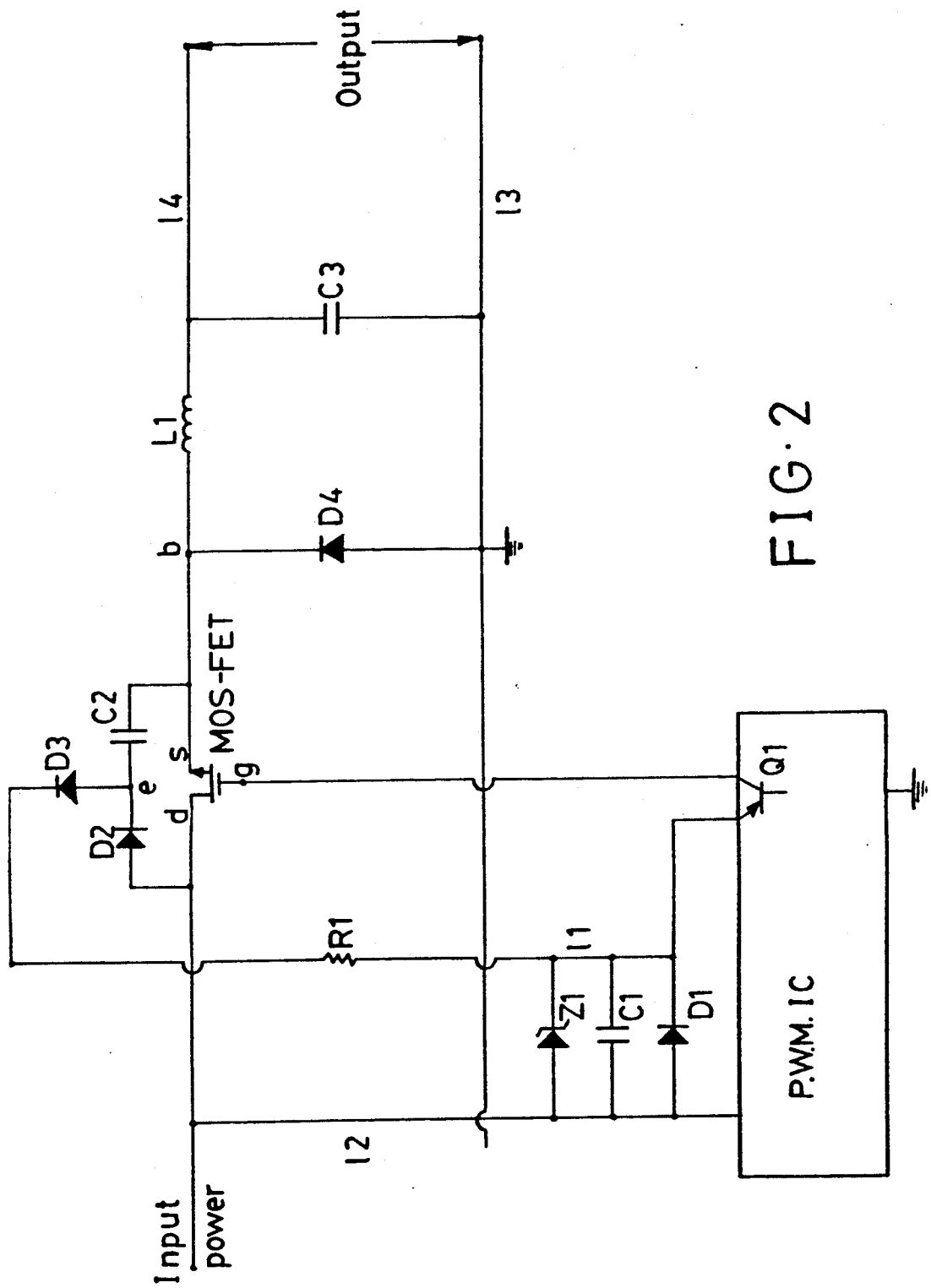
FIG. 2 is a schematic digram of an embodiment of the regulated step-down switching circuit of the present invention.

Referring to the FIG. 2, an embodiment of the present invention comprises a MOS-FET, a PWM IC, a zener diode (Z1), diodes (D1, D2, D3 and D4), capacitors (C1, C2 and C3), a resistor (R1), an inductor (L1) and etc.; wherein, the drain 'd' of the MOS-FET is connected to the power input, the source 's' of the same component is connected to the power output terminal via an inductor L1, and the gate 'g' of the MOS-FET is connected to one of the PNP or NPN transistors Q1 inside the (PWM) Pulse Width Modulator. Diode D2 and capacitor C2 are series connected between drain d and source s. Diode has one terminal connected to the common junction of D2 and C2 and another terminal connected to a first terminal of a resistor R1. The other terminal of resistor R1 is connected to the transistor Q1 inside the PWM IC. A lead wire 12 connects the power input terminal and the PWM IC to provide electric power to the same, and between lead wires 11 and 12, is connected a zener diode Z1, a capacitor C1, and a diode D1 parallel branches. A ground lead wire 13 is furnished to connect the common input power ground terminal to the output power ground terminal. The two terminals of L1 are connected via respective diode D4 and capacitor C3 parallel branches to ground lead wire 13.

The operating principles of the present invention are described as follows:

In general, a MOS-FET goes into conductive state only when its gate voltage (Vg) becomes greater than the input power voltage (Vin) for 6 to 15 volts. In the present invention, when input power is initially applied on, the potential at point 'b' is Vb=0, therefore, capacitor C2 starts charging to a potential VC2, which equals the potential difference between input power voltage Vin and diode D2's voltage drop VD2, i.e. VC2=Vin−VD2. At this time, transistor Q1, inside the PWM IC, starts to operate, which makes the MOS-FET go into a conductive state and the potential Vb at the point 'b' is therefore rising. The potential Ve at the junction point 'e' of capacitor C2 and diode D2 can be represented by: Ve=VD4+VC2; therefore, when voltage is rising up, potential Ve will become greater than potential Vin, which makes a part of the circuit of the present invention operate. In the meantime, the diode D3 conducts, the capacitor C1 charges, and when the potential VC1 rises to a level which is greater than Vin, the whole circuit will then go into operation.

From the above statement, it can be understood that the circuit of the present invention utilizes a zener diode Z1, a MOS-FET, a PWM IC as its major parts. In comparison with the typical conventional step-down regulated circuit developed by "Linear Technology Corporation" U.S.A., many components as well as the associated product costs can be saved. Furthermore, since the present invention operates only when the voltage rises the circuit consumes power intermittently, so it energy-saving, precise in action and reliable in its performance.

Although the present invention has been described with a certain degree of particularity, the present disclosure has been made by way of example and changed in details of structure may be made without departing from the spirit thereof.

I claim:

1. A regulated step-down switching circuit for a DC-to-DC converter of a power supply, said DC-to-DC circuit including a pulse width modulator (PWM) with a switching transistor for receiving a first supply potential and supplying a control signal, said switching circuit comprising:
   - a MOS-FET receiving said first supply potential at a first source/drain and supplying said first supply potential at a second source/drain in response to said control signal applied to a control gate of said MOS-FET;
   - a first diode and a first capacitor connected in series to form a first series circuit, said first series circuit connected between said first and second source/drains of said MOS-FET for supplying a second supply potential at the common junction of said first diode and first capacitor;
   - a second diode and a resistor connected in series to from a second series circuit, said second series circuit having a first terminal connected to said junction of said first diode and first capacitor for receiving said second supply potential and a second terminal connected to said PWM switching transistor for supplying said second supply potential thereto; and
   - a parallel combination of a zener diode, a second capacitor and a third diode, a first node of said parallel combination receiving said first supply potential and a second node supplying said first supply potential to said PWM switching transistor through said parallel combination.

2. The switching circuit according to claim 1, further comprising a pi network receiving said first supply potential from said MOS-FET second source/drain and supplying said first supply potential at an output terminal.

3. The switching circuit according to claim 2, wherein said pi network comprises an input node receiving said first supply potential from said MOS-FET second source/drain, a fourth diode connected from said input node to a source of ground potential, an inductor connected from said input node to an output node, and a third capacitor connected from said output node to said source of ground potential.

4. A regulated step-down circuit for use with a pulse width modulator (PWM) having a first transistor connected to an intermediate node for receiving a first potential, said regulated step-down circuit comprising:
   - an input node for receiving a power supply second potential;
   - a MOS-FET having a first source/drain connected to said input node for receiving said second potential, a control gate receiving a control signal from said first transistor, and a second source/drain connected to an output node for supplying an output potential;
   - a first diode and a first capacitor connected in series forming a common node, said first diode connected in common to said input node and said MOS-FET first source/drain and said first capacitor connected to said MOS-FET second source/drain;
   - a second diode and a resistor connected in series between said common node and said intermediate node;
   - a parallel combination of a zener diode, third diode and second capacitor connected between said input node and said intermediate node for supplying said first potential to said first transistor; and
   - a fourth diode having a first terminal connected in common with said MOS-FET second source/drain and said output node and a second terminal connected to a source of ground potential.

5. The circuit of claim 4, further comprising:
   - an inductor connected between (i) the common connection of said MOS-FET second source/drain and said first terminal of said fourth diode and (ii) said output node; and
   - a third capacitor connected between said output node and said source of ground potential.

* * * * *